(12) United States Patent
Kim

(10) Patent No.: US 11,234,047 B2
(45) Date of Patent: Jan. 25, 2022

(54) SERVER AND CONTROLLING METHOD THEREOF

(71) Applicant: SAMSUNG ELECTRONICS CO., LTD., Suwon-si (KR)

(72) Inventor: Kyunghoon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/091,590

(22) Filed: Nov. 6, 2020

(65) Prior Publication Data

US 2021/0160564 A1 May 27, 2021

(30) Foreign Application Priority Data

Nov. 27, 2019 (KR) .................. 10-2019-0154734

(51) Int. Cl.
*H04N 21/438* (2011.01)
*H04N 21/643* (2011.01)
(Continued)

(52) U.S. Cl.
CPC ... *H04N 21/4383* (2013.01); *H04N 21/43615* (2013.01); *H04N 21/44209* (2013.01); *H04N 21/6125* (2013.01); *H04N 21/64322* (2013.01)

(58) Field of Classification Search
CPC ......... H04N 21/4383; H04N 21/64322; H04N 21/43615; H04N 21/6125;
(Continued)

(56) References Cited

U.S. PATENT DOCUMENTS 7,697,939 B2  4/2010  Wada et al.
7,917,925 B2  3/2011  Eigeldinger
(Continued)

FOREIGN PATENT DOCUMENTS

EP    2 521 298 B1    8/2014
JP    2006-174231 A   6/2006
(Continued)

OTHER PUBLICATIONS

International Search Report and Written Opinion dated Feb. 26, 2021, issued by the International Searching Authority in International Application No. PCT/KR2020/016288 (PCT/ISA/210 and 237).

*Primary Examiner* — Fernando Alcon
(74) *Attorney, Agent, or Firm* — Sughrue Mion, PLLC

(57) ABSTRACT

A server is provided. The server includes a communicator and a processor configured to, from a plurality of electronic apparatuses that reproduce content received from an external server, receive information regarding reproduction of the content and information on home network environments of the plurality of electronic apparatuses through the communicator, based on the information regarding reproduction of the content, identify a plurality of qualities of a channel providing the content for each of the plurality of home network environments, and transmit information on the plurality of qualities of the channel identified for each of the plurality of home network environments to the external server through the communicator to add the information on the plurality of qualities of the channel to a channel list provided by the external server.

18 Claims, 12 Drawing Sheets

(51) Int. Cl.
*H04N 21/61* (2011.01)
*H04N 21/442* (2011.01)
*H04N 21/436* (2011.01)

(58) Field of Classification Search
CPC ........... H04N 21/44209; H04N 21/238; H04N 21/24; H04N 21/2665
See application file for complete search history.

(56) References Cited

U.S. PATENT DOCUMENTS

| | | | |
|---|---|---|---|
| 8,572,666 B2* | 10/2013 | Bugenhagen | G06Q 30/02 725/119 |
| 10,341,739 B2 | 7/2019 | Klappert et al. | |
| 2003/0237097 A1* | 12/2003 | Marshall | H04N 7/17309 725/105 |
| 2004/0128694 A1* | 7/2004 | Bantz | H04N 21/4821 725/95 |
| 2007/0214482 A1* | 9/2007 | Nguyen | G06F 3/04842 725/91 |
| 2008/0028424 A1 | 1/2008 | Cho | |
| 2008/0172692 A1* | 7/2008 | Kondo | H04N 7/17318 725/39 |
| 2009/0178078 A1* | 7/2009 | Daigle | H04N 21/4312 725/40 |
| 2009/0193484 A1* | 7/2009 | Zhang | H04N 21/64738 725/112 |
| 2010/0226312 A1 | 9/2010 | Kim et al. | |
| 2012/0117597 A1* | 5/2012 | Tomioka | H04N 21/462 725/39 |
| 2012/0284763 A1* | 11/2012 | Choi | H04N 21/482 725/110 |
| 2013/0132994 A1* | 5/2013 | Murphy | H04N 21/2665 725/23 |
| 2017/0332146 A1* | 11/2017 | Klappert | H04N 21/4821 |
| 2019/0028777 A1* | 1/2019 | Rao | H04N 21/4383 |
| 2019/0124392 A1* | 4/2019 | Chakra | H04L 65/601 |
| 2019/0124408 A1 | 4/2019 | Xiong et al. | |
| 2019/0215566 A1* | 7/2019 | Shimizu | H04N 21/4405 |

FOREIGN PATENT DOCUMENTS

| | | |
|---|---|---|
| JP | 2007-074582 A | 3/2007 |
| JP | 2008-060960 A | 3/2008 |
| KR | 10-2006-0135354 A | 12/2006 |
| KR | 10-2010-0051961 A | 5/2010 |
| KR | 10-1474193 B1 | 12/2014 |
| KR | 10-2016-0069444 A | 6/2016 |
| KR | 10-2019-0017042 A | 2/2019 |
| WO | 2008/009486 A1 | 1/2008 |
| WO | 2009/113040 A2 | 9/2009 |

* cited by examiner

FIG. 5

|  |  |  | WHETHER CONTENT IS REPRODUCED NORMALLY | | |
|---|---|---|---|---|---|
| FIRST ISP | FIRST ELECTRONIC APPARATUS | Channel A | Yes | Yes | No |
| | SECOND ELECTRONIC APPARATUS | Channel A | Yes | Yes | No |
| | THIRD ELECTRONIC APPARATUS | Channel A | Yes | Yes | No |
| SECOND ISP | FOURTH ELECTRONIC APPARATUS | Channel A | Yes Case 1 | No Case 2 | No Case 3 |
| | FIFTH ELECTRONIC APPARATUS | Channel A | Yes | No | No |
| | SIXTH ELECTRONIC APPARATUS | Channel A | Yes | No | No |

FIG. 6
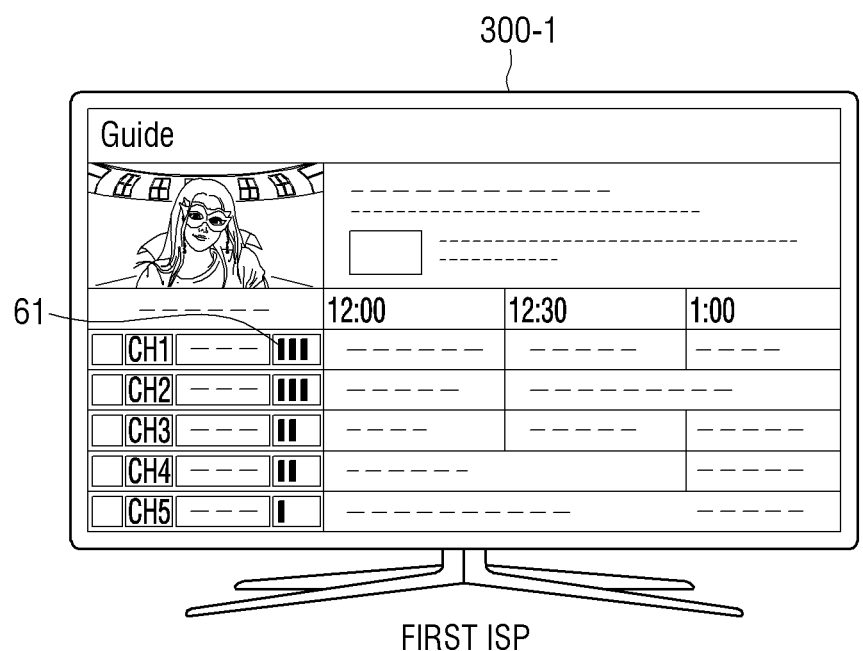
FIRST ISP
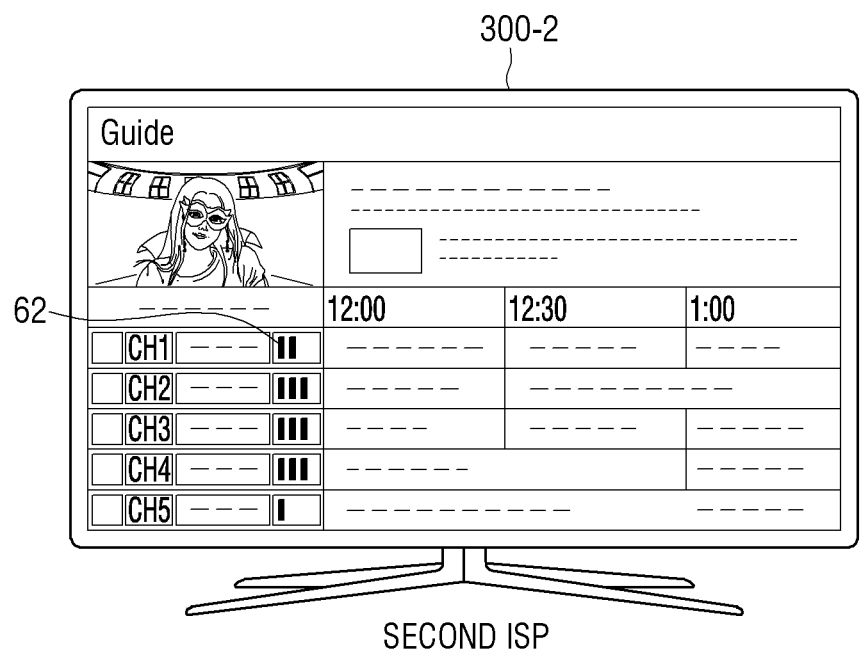
SECOND ISP

FIG. 8

|  | | | WHETHER CONTENT IS REPRODUCED NORMALLY |
|---|---|---|---|
| FIRST ISP | FIRST ELECTRONIC APPARATUS | Channel A | Yes |
| | SECOND ELECTRONIC APPARATUS | Channel A | No |
| | THIRD ELECTRONIC APPARATUS | Channel A | Yes |

SERVER AND CONTROLLING METHOD THEREOF

CROSS-REFERENCE TO RELATED APPLICATIONS

This application claims priority from Korean Patent Application No. 10-2019-0154734 filed in the Korean Intellectual Property Office on Nov. 27, 2019, the disclosure of which is incorporated herein by reference.

BACKGROUND

1. Field

Aspects of the exemplary embodiments relate to a server and a controlling method thereof and more particularly, to a server capable of providing information on a quality of a channel and a controlling method thereof.

2. Description of the Related Art

Recently, with the advance of electronic technologies, various electronic apparatuses have been developed. In particular, in recent years, electronic apparatuses that reproduce various contents such as Internet Protocol Television (IPTV) through various channels have been developed.

However, in the case of contents of some channels, there is a problem that the contents are not reproduced smoothly for various reasons such as limited bandwidth of a network, traffic generated due to an increase in data transmission, transmission errors, etc.

In this case, users watching the contents may feel inconvenience due to screen tearing phenomenon, excessive buffering, etc.

SUMMARY

A server according to an embodiment includes a communicator and a processor configured to, from a plurality of electronic apparatuses that reproduce content received from an external server, receive information regarding reproduction of the content and information on home network environments of the plurality of electronic apparatuses through the communicator, based on the information regarding reproduction of the content, identify a plurality of qualities of a channel providing the content for each of the plurality of home network environments, and transmit information on the plurality of qualities of the channel identified for each of the plurality of home network environments to the external server through the communicator to add the information on the plurality of qualities of the channel to a channel list provided by the external server.

The channel list may be transmitted from the external server to an external electronic apparatus based on a user command to request a channel list, which is input to the external electronic apparatus, and the information on the plurality of qualities of the channel included in the channel list may include information on a quality of a channel that is identified based on a home network environment corresponding to a home network environment of the external electronic apparatus from among the plurality of home network environments.

The information on the home network environments may include at least one of information on a home network speed of the plurality of electronic apparatuses or information on a home network bandwidth of the plurality of electronic apparatuses.

The channel list may include information on the home network environment of the external electronic apparatus.

The processor may be configured to identify a quality of a channel that provides the content based on at least one of an initial buffering time required for an electronic apparatus to reproduce the content or the number of buffering occurred in the electronic apparatus during reproduction of the content, included in information regarding reproduction of the content.

The plurality of electronic apparatuses may be connected to networks of a plurality of different Internet Service Providers (ISPs), and the processor may be configured to, based on the information regarding reproduction of the content, identify the plurality of qualities of the channel that provides the content for each network of the networks of the plurality of ISPs, based on the information on the home network environments of the plurality of electronic apparatuses and the information on the plurality of qualities of the channel, identify network qualities of the plurality of ISPs, and transmit information on the network qualities of the plurality of ISPs to the external server to add information on the network qualities of the plurality of ISPs to the channel list.

The processor may be configured to identify a quality of the channel in a first electronic apparatus connected a network of a first ISP of the plurality of ISPs as a first quality and identify a quality of the channel in a second electronic apparatus connected to a network of a second ISP of the plurality of ISPs as a second quality, and based on a difference between home network environments of the first and second electronic apparatuses is equal to or less than a predetermined range, identify a network quality of the first ISP as a first quality and identify a network quality of the second ISP as a second quality that is lower than the first quality.

The processor may be configured to identify a quality of a network of the external server based on a network quality of the plurality of ISPs.

The processor may be configured to, based on a network quality of a first ISP of the plurality of ISPs being identified as a first quality and a network quality of a second ISP of the plurality of ISPs being identified as a second quality that is lower than the first quality, identify a quality of a network of the external server as a first quality, based on a network quality of the plurality of ISPs being identified as the second quality, identify the quality of the network of the external server as a second quality, and transmit information on the quality of the network of the external server to the external server to add a quality of the content to the channel list.

The channel list may include information on a quality of the channel, information on a network quality of an ISP and information on a quality of a network of the external server.

A controlling method of a server according to an embodiment includes, from a plurality of electronic apparatuses that reproduce content received from an external server, receiving information regarding reproduction of the content and information on home network environments of the plurality of electronic apparatuses through a communicator, based on the information regarding reproduction of the content, identifying a plurality of qualities of a channel providing the content for each of the plurality of home network environments, and transmitting information on the plurality of qualities of the channel identified for each of the plurality of home network environments to the external server through the communicator to add the information on the plurality of qualities of the channel to a channel list provided by the external server.

BRIEF DESCRIPTION OF THE DRAWINGS

FIG. 5 is a view provided to explain an example for identifying information on a quality of a channel for each Internet Service Provider (ISP) according to an embodiment;

FIG. 6 is a view provided to explain an example for displaying qualities of channels differently for each ISP according to an embodiment;

FIG. 8 is a view provided to explain an example for identifying a quality of a channel based on a home network environment of an electronic apparatus according to an embodiment;

DETAILED DESCRIPTION

First, general terms have been selected in consideration of functions of the present disclosure as terms used in the specification and the claims. However, these terms may be changed depending on an intention of those skilled in the art, legal or technical interpretation, the emergence of a new technology, and the like. In addition, some terms are terms arbitrarily selected by an applicant. These terms may be interpreted in the meanings defined herein, and may be interpreted based on a general content of the specification and usual technical knowledge in the art as long as they are not specifically defined.

In addition, in describing the present disclosure, when it is determined that detailed descriptions of related known functions or configurations may unnecessarily obscure the subject matter of the present disclosure, detailed descriptions thereof are abbreviated or omitted.

Furthermore, embodiments of the present disclosure will be described in detail with reference to the accompanying drawings and the contents described in the accompanying drawings, but the present disclosure is not restricted or limited by the embodiments.

Hereinafter, the present disclosure will be described in detail with reference to the drawings attached hereto.

The present disclosure provides a server capable of providing information on a quality of a channel and a controlling method thereof.

Figure 1:
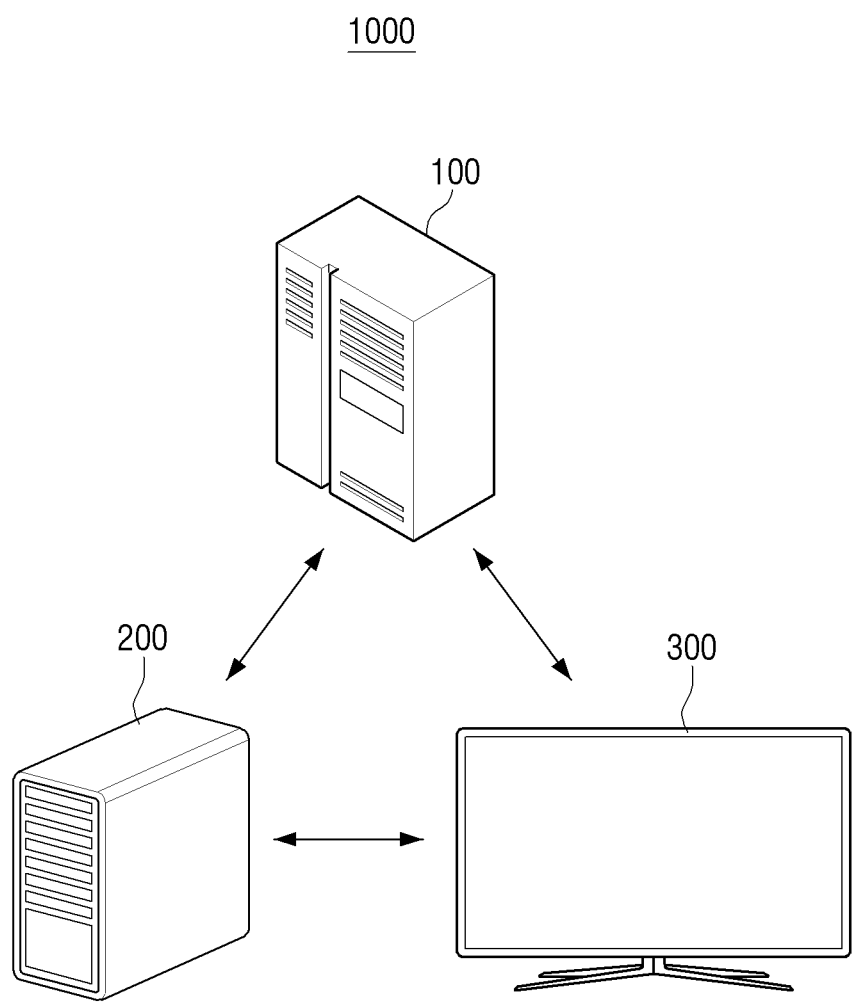
FIG. 1 is a view illustrating an electronic system according to an embodiment.

FIG. 1 is a view illustrating an electronic system according to an embodiment. Referring to FIG. 1, an electronic system 1000 according to an embodiment may include a server 100, an external server 200 and an electronic apparatus 300. Meanwhile, one electronic apparatus 300 is illustrated in FIG. 1, but the electronic system 1000 according to an embodiment may include a plurality of electronic apparatuses.

The server 100, the external server 200 and the electronic apparatus 300 may perform communication with one another and transmit/receive various data.

For example, the electronic apparatus 300 may transmit a signal for requesting content of a selected channel to the external server 200. In addition, the electronic apparatus 300 may reproduce the content received from the external server 200, and transmit information regarding the reproduction of the content to the server 100. Here, the information regarding the reproduction of the content, for example, may include information regarding whether the content has been reproduced in the electronic apparatus 300, information regarding an initial buffering time required for the electronic apparatus 300 to reproduce the content, information regarding the number of buffering occurred in the electronic apparatus 300 while the content is reproduced, and etc.

The server 100 may identify a quality of a channel that provides the corresponding content based on the information regarding the reproduction of the content received from the electronic apparatus 300. For example, based on the information regarding the reproduction of the content that has been reproduced in the electronic apparatus 300, the initial buffering time required for the electronic apparatus 300 to reproduce the content is equal to or less than a predetermined time, and the number of buffering occurred in the electronic apparatus 300 while the content is reproduced is equal to or less than a predetermined number, the server 100 may identify that a quality of a channel that provides the content is a first quality. If the content has not been reproduced in the electronic apparatus 300, the initial buffering time required for the electronic apparatus 300 to reproduce the content exceeds the predetermined time, or the number of buffering occurred in the electronic apparatus 300 while the content is reproduced exceeds the predetermined number based on the information regarding the reproduction of the content, the server 100 may identify that the quality of the channel that provides the content is a second quality that is relatively lower than the first quality. The specific example of identifying a quality of a channel will be described later with reference to FIG. 2.

The server 100 may transmit information regarding a quality of a channel that is identified based on the information regarding the reproduction of the content to the external server 200.

Here, the external server 200 is a device that provides a channel list, and the external device 200 may provide the channel list to an electronic apparatus that requests the channel list from among a plurality of electronic apparatuses. In particular, the external server 200 may transmit a channel list including information regarding a quality of a channel based on information regarding a quality of the channel received from the server 100. Here, the electronic apparatus that requests a channel list may be not only the above-described electronic apparatus 300 but also other electronic apparatuses that perform a function similar to that of the above-described electronic apparatus 300.

The electronic apparatus 300 may provide a channel list including information regarding a quality of a plurality of channels based on a channel list received from the external server 200. For example, if the electronic apparatus 300 is implemented as a display device as illustrated in FIG. 1, the electronic apparatus 300 may provide a channel list including information regarding a quality of a plurality of channels through a display. Alternatively, if the electronic apparatus 300 is implemented as an electronic apparatus connected to a display device such as a set-top box, etc., the electronic apparatus 300 may provide a channel list including information regarding a quality of a plurality of channels through the display device.

Accordingly, a user may check a quality of a channel for each channel, and select a channel providing content that can be reproduced normally (or content that can be reproduced smoothly).

Figure 2:
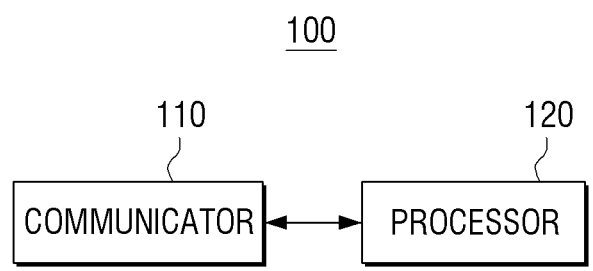
FIG. 2 is a block diagram provided to explain a server according to an embodiment.

FIG. 2 is a block diagram provided to explain a server according to an embodiment.

Referring to FIG. 2, the server 100 according to an embodiment includes a communicator 110 and a processor 120.

The communicator 110 may perform communication with various external devices and transmit/receive various data. Specifically, the communicator 110 may perform communication with external devices not only through a wireless communication method such as WiFi, mobile communication, etc. but also a wired communication method using an optical axis cable, an optical cable, etc. For example, the communicator 110 may perform communication with the electronic apparatus 300 to receive information regarding reproduction of content from the electronic apparatus 300, and may perform communication with the external server 200 to transmit information regarding a quality of a channel to the external server 200. To this end, the communicator 110 may include a WiFi chip, a wireless communication chip, etc.

The processor 120 is configured to control the overall operations of the server 100. The processor 120 may control a plurality of hardware or software components connected to the processor 120 by driving an operating system or an application, and may perform various data processing and operations. To this end, the processor 120 may include one or more of a central processing unit (CPU), an application processor (AP) or a communication processor (CP). In addition, the processor 120 may be implemented as at least one of a general processor, a digital signal processor, an application specific integrated circuit (ASIC), a system on chip (SoC), a Microcomputer (MICOM), or so.

Hereinafter, the operation of the processor 120 will be described with reference to the overall electronic system 1000 of the present disclosure.

Figure 3:
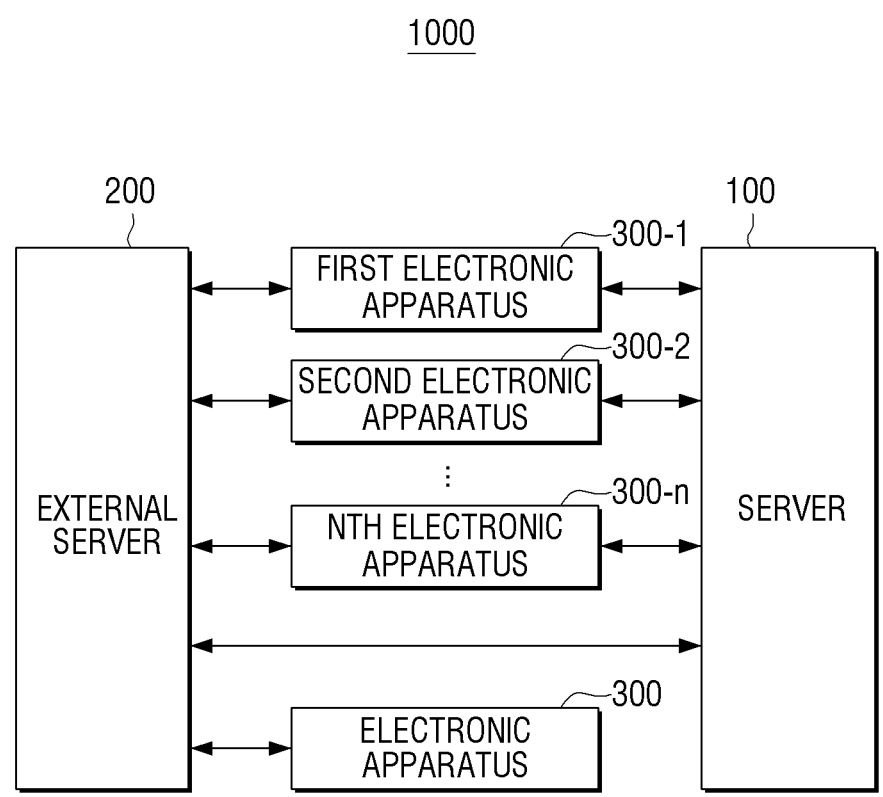
FIG. 3 is a block diagram provided to explain an electronic system according to an embodiment.

FIG. 3 is a block diagram provided to explain an electronic system according to an embodiment.

Referring to FIG. 3, the electronic system 1000 according to an embodiment may include the server 100, the external server 200, first to nth electronic apparatuses 300-1 to 300-n, and the electronic apparatus 300. Here, at least one of the first to nth electronic apparatuses 300-1 to 300-n may be the above-described electronic apparatus 300, and the electronic apparatus 300 may be at least one of the first to nth electronic apparatuses 300-1 to 300-n.

The first electronic apparatus 300-1 may request a channel list from the external server 200 based on a user command to request a channel list. Here, the user command to request a channel list may be a user command to push a button for displaying a channel list provided in a remote control device that communicates with the first electronic apparatus 300-1, but is not limited thereto.

When a signal for requesting a channel list is received from the first electronic apparatus 300-1, the external server 200 may transmit a channel list to the first electronic apparatus 300-1. Specifically, the external server 200 may transmit, to the first electronic apparatus 300-1, a channel list provided from an Internet Service Provider (ISP) constituting a network with the first electronic apparatus 300-1 from among a plurality of channel lists. For example, if the first electronic apparatus 300-1 is an electronic apparatus registered with a first ISP, the external server 200 may transmit a channel list provided by the first ISP to the first electronic apparatus 300-1. To this end, the external server 200 may pre-store a plurality of channel lists corresponding to a plurality of ISPs.

The first electronic apparatus 300-1 may provide a channel list received from the external server 200. For example, if the first electronic apparatus 300-1 is implemented as a display device, the first electronic apparatus 300-1 may display a channel list through a display. Alternatively, if the first electronic apparatus 300-1 is implemented as an electronic apparatus connected to a display device, such as a set-top box, the first electronic apparatus 300-1 may provide a channel list through a display device.

When a user command to select one of a plurality of channels included in a channel list is received, the first electronic apparatus 300-1 may transmit a signal for requesting content of the selected channel to the external server 200. Specifically, if the first electronic apparatus 300-1 is an electronic apparatus registered with the first ISP, the first electronic apparatus 300-1 may transmit a signal for requesting content of the selected channel to the external server 200 through a network of the first ISP.

In this case, the external server 200 may transmit content of the channel selected by the first electronic apparatus 300-1 to the first electronic apparatus 300-1. Specifically, the external server 200 may transmit the content of the selected channel to the first electronic apparatus 300-1 in a streaming method through a network of the first ISP.

The first electronic apparatus 300-1 may reproduce the content received from the external server 200 through a network of the first ISP. Specifically, if the first electronic apparatus 300-1 is implemented as a display device, the first electronic apparatus 300-1 may reproduce the content received from the external server 200 through a display, and if the first electronic apparatus 300-1 is implemented as an electronic apparatus connected to a display device, such as a set-top box, the first electronic apparatus 300-1 may reproduce the content received from the external server 200 through a display device.

Meanwhile, in the above description, the first electronic apparatus 300-1 reproduces content of the channel that is selected through a channel list, but the first electronic apparatus 300-1 may reproduce content of the channel that is selected based on a channel switch command.

The first electronic apparatus 300-1 may transmit information regarding reproduction of content to the server 100. Specifically, the first electronic apparatus 300-1 may transmit, to the server 100, at least one information regarding reproduction of content from among information regarding whether content of a selected channel is reproduced, information on an initial buffering time required to reproduce the content of the selected channel or information on the number of buffering occurred during reproducing of the content of the selected channel. Meanwhile, this is only an example, and the information regarding reproduction of content may include various information to determine whether the content is reproduced normally such as the number of screen breaks occurred during reproduction of the content and whether the screen is broken. According to an embodiment, the information regarding reproduction of content may be referred to as log information.

Meanwhile, similarly to the above-described first electronic apparatus 300-1, the second to the nth electronic apparatuses (300-2 to 300-n) may transmit information regarding reproduction of content to the server 100.

The processor 120 of the server 100 may identify a quality of a channel selected by each electronic apparatus based on information regarding reproduction of content received from the first to the nth electronic apparatuses 300-1 to 300-n.

For example, the processor 120 may identify a quality of a channel selected by the first electronic apparatus 300-1 based on information regarding reproduction of content received from the first electronic apparatus 300-1. Specifically, based on the information regarding reproduction of content received from the first electronic apparatus 300-1, the processor 120 may determine at least one of whether content of the selected channel is reproduced in the first electronic apparatus 300-1, an initial buffering time required for the first electronic apparatus 300-1 to reproduce the content of the selected channel and the number of buffering occurred in the first electronic apparatus 300-1 while the content of the selected channel is reproduced, and identify a quality of the selected channel in the first electronic apparatus 300-1 based on the result of the determination.

For example, in the case where channel A is selected in the first electronic apparatus 300-1, the processor 120 may identify that content of channel A is reproduced normally and the quality of channel A is the first quality if the processor 120 determines that the content of channel A is reproduced in the first electronic apparatus 300-1, the initial buffering time required to reproduce the content of channel A is equal to or less than the initial buffering time that is generally (or on average) required to reproduce the content of channel A, and the number of buffering occurred in the first electronic apparatus 300-1 while the content of channel A is reproduced is equal to or less than the number of buffering that generally (or on average) occurs while the content of channel A is reproduced. Here, information on the initial buffering time that is generally required to reproduce the content of channel A and information on the number of buffering that generally occurs while the content of channel A is reproduced may be pre-stored in the server 100, or may be received from the external server 200.

Meanwhile, the processor 120 may identify that the content of channel A is not reproduced normally in the first electronic apparatus 300-1, and the quality of channel A is the second quality that is lower than the first quality if the content of channel A is not reproduced in the first electronic apparatus 300-1, the initial buffering time required to reproduce the content of channel A exceeds the initial buffering time that is generally required to reproduce the content of channel A, or the number of buffering occurred in the first electronic apparatus 300-1 while the content of channel A is reproduced exceeds the number of buffering that generally occurs in the first electronic apparatus 300-1 while the content of channel A is reproduced.

Similarly, the processor 120 may identify a quality of a selected channel in the second to the nth electronic apparatuses 300-2 to 300-n based on information regarding reproduction of content received from the second to the nth electronic apparatuses 300-2 to 300-n.

The processor 120 may control the communicator 110 to transmit information on a quality of a plurality of channels to the external server 200.

Meanwhile, in the above description, the quality of a channel is identified as one of the first quality or the second quality based on the information regarding reproduction of content, but according to an embodiment, the processor 120 may identify the quality of a channel as one of the first to nth qualities. For example, the server 100 may identify that the longer the initial buffering time, the lower the quality of a channel, and the more the number of buffering during reproduction of content, the lower the quality of a channel.

In addition, in the above description, information on a quality of a channel is generated by the server 100, but the information on a quality of a channel may be generated by the external server 200. For example, the external server 200 may receive information regarding reproduction of content from the plurality of electronic apparatuses 300-1 to 300-n and similar to the operation of the above-described server 100, may identify a quality of a selected channel in each electronic apparatus based on the information regarding reproduction of content.

Further, in the above description, the external server 200 stores a plurality of channel lists corresponding to a plurality of ISPs, but according to an embodiment, the external server 200 may store only a channel list corresponding to a specific ISP as a server that manages the specific ISP. In this case, an electronic apparatus connected to a network of the first ISP may receive a channel list provided by the first ISP from an external server corresponding to the first ISP when a user command to display a channel list is input. An electronic apparatus connected to a network of the second ISP may receive a channel list provided by the second ISP from an external server corresponding to the second ISP when a user command to display a channel list is input.

Subsequently, when a signal for requesting a channel list is received from the electronic apparatus 300, the external server 200 may transmit a channel list including information on a quality of a plurality of channels to the electronic apparatus 300.

The electronic apparatus 300 may provide a channel list including information on a quality of a plurality of channels.

Accordingly, a user may check a quality of channels for each channel and select a channel that provides reproducible content normally.

Meanwhile, the processor 120 may identify a quality of a channel for each home network environment of an electronic apparatus.

To this end, the processor 120 may receive information regarding reproduction of content and information on a home network environment of an electronic apparatus from the electronic apparatus through the communicator 110. Here, the home network of the electronic apparatus is a network formed between electronic apparatuses in a home and for example, the home network may be a network formed between the electronic apparatus 300 and an Access Point (AP) and the information on a home network environment of the electronic apparatus may include information on a network speed of the electronic apparatus or information on a network bandwidth.

For example, if the first electronic apparatus 300-1 reproduces the first content as the first channel providing the first content is selected, the processor 120 may receive information regarding reproduction of the first content and information on a home network environment of the first electronic apparatus 300-1 from the first electronic apparatus 300-1. Similarly, if the second electronic apparatus 300-2 reproduces the first content as the first channel providing the first content is selected, the processor 120 may receive information regarding reproduction of the first content and information on a home network environment of the second electronic apparatus 300-2 from the second electronic apparatus 300-2.

The processor 120 may identify a quality of a channel for each home network environment of the electronic apparatus.

Specifically, if the quality of channel 1 determined in the home network environment of the first electronic apparatus 300-1 is the first quality, and the home network environment of the first electronic apparatus 300-1 is the first home network environment, the processor 120 may identify that the quality of the first home network environment of channel 1 is the first quality. If the quality of channel 1 determined in the home network environment of the second electronic apparatus 300-2 is the second quality, and the home network environment of the second electronic apparatus 300-2 is the second home network environment, the processor 120 may identify that the quality of the second home environment of channel 1 is the second quality.

For example, if information that the home network speed of the first electronic apparatus 300-1 is 1 Gbps is included in information on the first home network environment, the processor 120 may identify that channel 1 provides content in the first quality at the home network speed of 1 Gbps. If information that the home network speed of the second electronic apparatus 300-2 is 100 Mbps is included in information on the second home network environment, the processor 120 may identify that channel 1 provides content in the second quality at the home network speed of 100 Mbps.

The processor 120 may transmit information on a quality of a channel that is identified for each home network environment to the external server 200 through the communicator 110.

Specifically, the processor 120 may transmit information on a quality of a channel where a quality of a channel is matched to each home network environment, to the external server 200. In the above-described example, the processor 120 may transmit, to the external server 200, information on a quality of channel 1 where the first home network environment is matched to the first quality and information on a quality of channel 1 where the second home network environment is matched to the second quality.

Subsequently, when a signal for requesting a channel list is received from the electronic apparatus 300, the external server 200 may transmit a channel list based on the home network environment of the electronic apparatus 300 to the electronic apparatus 300.

Specifically, when a user command to display a channel list is input, the electronic apparatus 300 may transmit a signal for requesting the channel list and information on the home network environment of the electronic apparatus 300 to the external server 200. The external server 200 may identify a quality of a channel corresponding to the home network environment of the electronic apparatus 300 based on information on a quality of a channel where a quality of a channel is matched to each home network environment, received from the server 100. In addition, the external server 200 may transmit a channel list including information on a quality of a channel corresponding to the home network environment of the electronic apparatus 300 to the electronic apparatus 300.

For example, if the quality of channel 1 in the first home network environment is the first quality, the quality of channel 1 in the second home network environment is the second quality, and the home network environment of the electronic apparatus 300 requesting a channel list corresponds to the first home network environment, the external server 200 may transmit a channel list including information that channel 1 is the first quality to the electronic apparatus 300. Here, the case where the home network environment of the electronic apparatus 300 corresponds to the first home network environment includes not only the case where the home network environment of the electronic apparatus 300 is completely consistent with the first home network environment but also the case where home network environment of the electronic apparatus 300 is consistent with the first home network environment within a predetermined range. For example, in the case where the predetermined range is a network speed of 200 Mbps, if the home network speed of the electronic apparatus 300 is 800 Mbps and the first home network speed is 1 Gbps, it can be said that the home network environment of the electronic apparatus 300 corresponds to the first home network environment.

Accordingly, the electronic apparatus 300 may display a channel list including information on a quality of a channel that is generated based on the home network environment of the electronic apparatus 300. As such, by providing a channel list customized for the electronic apparatus 300, a user may be provided with information regarding a channel that can be reproduced smoothly in the electronic apparatus 300 in a home.

Figure 4:
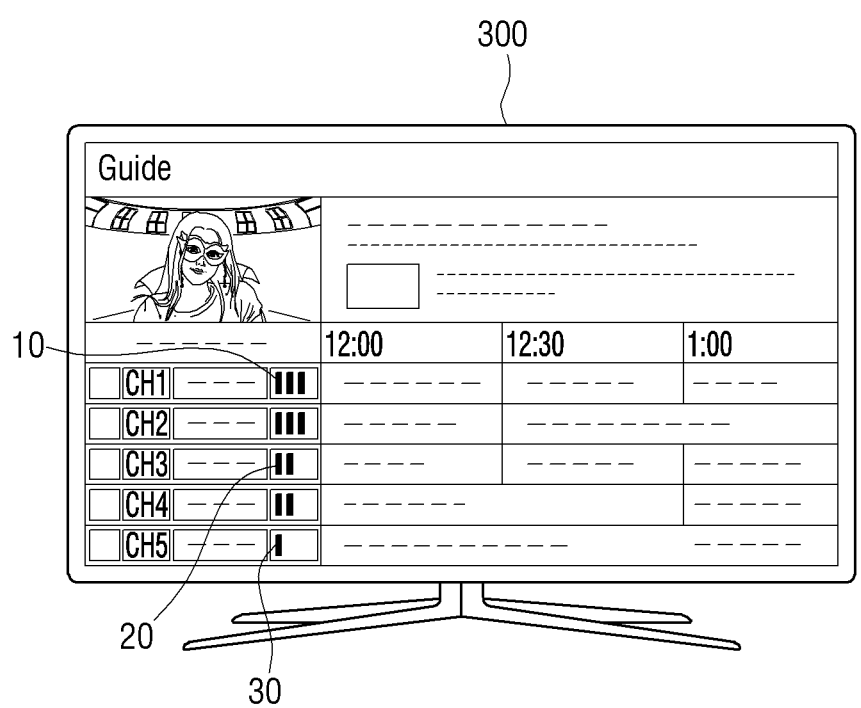
FIG. 4 is a view illustrating a channel list including information regarding qualities of a plurality of channels according to an embodiment.

For example, referring to FIG. 4, the electronic apparatus 300 may display a channel list including information on a quality of a plurality of channels. The channel list illustrated in FIG. 4 includes information that the quality of CH1 and CH2 is the first quality (10), information that the quality of CH3 and CH4 is the second quality (20) and information that the quality of CH5 is the third quality (30). Meanwhile, FIG. 4 illustrates an example where information on a quality of each channel is displayed using a graphical user interface, but this is only an example. The information on a quality of a channel may be displayed using a text, etc.

Meanwhile, as described above, the information on a quality of a channel included in a channel list may vary depending on a home network environment of each electronic apparatus. Accordingly, the first electronic apparatus 300-1 may display a channel list including information that channel 1 providing content has the first quality, and the second electronic apparatus 300-2 having a home network environment different from the first electronic apparatus 300-1 may display a channel list including information that channel 1 providing the same content has the second quality.

FIG. 5 is a view provided to explain an example for identifying information on a quality of a channel for each Internet Service Provider (ISP) according to an embodiment.

FIG. 5 is a view illustrating a case in which the first to the third electronic apparatuses are electronic apparatuses registered with the first ISP, and the fourth to the sixth electronic apparatuses are electronic apparatuses registered with the second ISP.

Hereinafter, a case where content of channel A is reproduced normally means a case where the content of channel A is reproduced in an electronic apparatus, the initial buffering time required for the electronic apparatus to reproduce the content of channel A is equal to or less than the initial buffering time generally (or on average) required to reproduce the content of channel A, and the number of buffering occurred in the electronic apparatus while the content of channel A is reproduced is equal to or less than the number of buffering generally (or on average) occurred while the content of channel A is reproduced. A case where the content of channel A is not reproduced normally means a case where the content of channel A is not reproduced in the electronic apparatus, the initial buffering time required for the electronic apparatus to reproduce the content of channel A exceeds the initial buffering time generally (or on average) required to reproduce the content of channel A, and the number of buffering occurred in the electronic apparatus while the content of channel A is reproduced exceeds the number of buffering generally (or on average) occurred while the content of channel A is reproduced.

The processor 120 may identify a quality of channel A providing the content, a network quality of an ISP and a network quality of the external server 200 based on information regarding reproduction of content received from a plurality of electronic apparatuses registered with different ISPs. Here, the network quality of the ISP may be a quality of a network formed between the ISPs and the electronic apparatuses, and the network quality of the external server 200 may be a quality of a network formed between the external server 200 and the ISP. According to an embodiment, the network of the external server 200 may be a Content Delivery Network (CDN), but is not limited thereto.

Specifically, if an electronic apparatus registered with the first ISP and an electronic apparatus registered with the second ISP reproduce content of channel A normally, the processor 120 may identify that the quality of channel A in the first and the second ISPs is the first quality.

In this case, the processor 120 may identify that the network quality of the external server 200 transmitting the content of channel A to the first and the second ISPs are the first quality, and the network quality of the first ISP transmitting the content of channel A to the electronic apparatus registered with the first ISP and the network quality of the second ISP transmitting the content of channel A to the electronic apparatus registered with the second ISP are the first quality as well.

For example, as shown in Case 1 of FIG. 5, if the first to the sixth electronic apparatuses reproduce the content of channel A normally, the processor 120 may identify that the quality of channel A is the first quality, the network quality of the first and the second ISPs is the first quality, and the network quality of the external server 200 is the first quality.

This is a case where all electronic apparatuses registered with the first and the second ISPs reproduce the content normally and thus, it can be said that content transmission from the external server 200 to the ISPs and content transmission from the ISPs to the electronic apparatuses is all normal.

Meanwhile, the processor 120 may identify a quality of a channel that provides content for each network of a plurality of ISPs based on information regarding reproduction of content received from a plurality of electronic apparatuses registered with different ISPs.

For example, if the electronic apparatus registered with the first ISP reproduces the content of channel A normally and the electronic apparatus registered with the second ISP does not reproduce the content of channel A normally, the processor 120 may identify that the quality of channel A in the first electronic apparatus connected to the network of the first ISP is the first quality and the quality of channel A in the second electronic apparatus connected to the network of the second ISP is the second quality that is lower than the first quality. In addition, if the difference between the home network environments of the first and the second electronic apparatuses is determined to be equal to or less than a predetermined range, the processor 120 may identify that the network quality of the first ISP is the first quality and the network quality of the second ISP is the second quality that is lower than the first quality.

For example, if the quality of channel A in the first electronic apparatus connected to the network of the first ISP is the first quality, the quality of channel A in the second electronic apparatus connected to the network of the second ISP is the second quality that is lower than the first quality, and the difference between the home network speeds of the first and the second electronic apparatuses is a predetermined range (e.g., 200 Mbps), the processor 320 may identify that the network quality of the first ISP is the first quality and the network quality of the second ISP is the second quality that is lower than the first quality.

In this case, the processor 120 may identify the network quality of the external server 200 based on the network quality of the first and the second ISPs.

Specifically, as described above, if it is identified that the network quality of the first ISP is the first quality and the network quality of the second ISP is the second quality that is lower than the first quality, the processor 120 may identify that the network quality of the external server 200 is the first quality. If it is identified that the network quality of all of a plurality of ISPs is the second quality, the processor 120 may identify that the network quality of the external server 200 is the second quality.

For example, as shown in Case 2 of FIG. 5, if the first to the third electronic apparatuses reproduce the content of channel A normally and the fourth to the sixth electronic apparatuses do not reproduce the content of channel A normally, the processor 120 may identify that the network quality of the first ISP is the first quality and the network quality of the second ISP is the second quality that is lower than the first quality. In addition, the processor 120 may identify that the network quality of the external server 200 is the first quality.

This is a case where the electronic apparatus registered with the first ISP reproduces the content of channel A normally and the electronic apparatus registered with the second ISP does not reproduce the content of channel A normally and thus, it can be said that the network environment of the external server 200 transmitting the content of channel A to the first and the second ISPs and the network environment of the first ISP transmitting the content of channel A to the electronic apparatus registered with the first ISP are in a normal state, but the network environment of the second ISP transmitting the content of channel A to the electronic apparatus registered with the second ISP is not in a normal state.

Accordingly, in Case 2, even though the channel list provided by the electronic apparatus registered with the first ISP and the channel list provided by the electronic apparatus registered with the second ISP are channels providing the same content, they may include information regarding different qualities.

For example, referring to FIG. 6, if the network quality of the first ISP is the first quality and the network quality of the second ISP is the second quality that is lower than the first quality, even though a channel provides the same content, the electronic apparatus 310-1 registered with the first ISP may display the quality of channel 1 as the first quality (61) and the electronic apparatus 320-2 registered with the second ISP may display the quality of channel 1 as the second quality (62).

Accordingly, a user may be provided with customized information on a quality of a channel.

Meanwhile, as shown in Case 3 of FIG. 5, if the electronic apparatus registered with the first ISP and the electronic apparatus registered with the second ISP do not reproduce the content of channel A normally, the processor 120 may identify that the network quality of the external server 200 transmitting the content of channel A to the first and the second ISPs is the second quality.

This is a case where all electronic apparatuses registered with the first and the second ISPs do not reproduce the content of channel A and thus, it can be said that the network environment of the external server 200 transmitting the content of channel A to the first and the second ISPs is not in a normal state.

Meanwhile, although channel A has been taken as an example in the above description, the processor 120 may identify a quality of a channel, a network quality of an ISP and a network quality of the external server 200 in a method similar to the above-described method with respect to other channels.

The processor may transmit at least one of information on a quality of a plurality of channels, information on a network quality of an ISP or information on a network quality of the external server 200 to the external server 200.

The electronic apparatus 300 may receive at least one of information on a quality of a plurality of channels, information on a network quality of an ISP or information on a network quality of the external server 200 from the external server 200 based on a user command to request a channel list.

In this case, as described above illustrated in FIG. 4, the electronic apparatus 300 may provide not only a channel list including information on a quality of a plurality of channels but also a channel list further including at least one of information on a home network environment of the electronic apparatus 300, information on a network quality of an ISP or information on a network quality of the external server 200 along with information on a quality of the plurality of channels.

Figure 7:
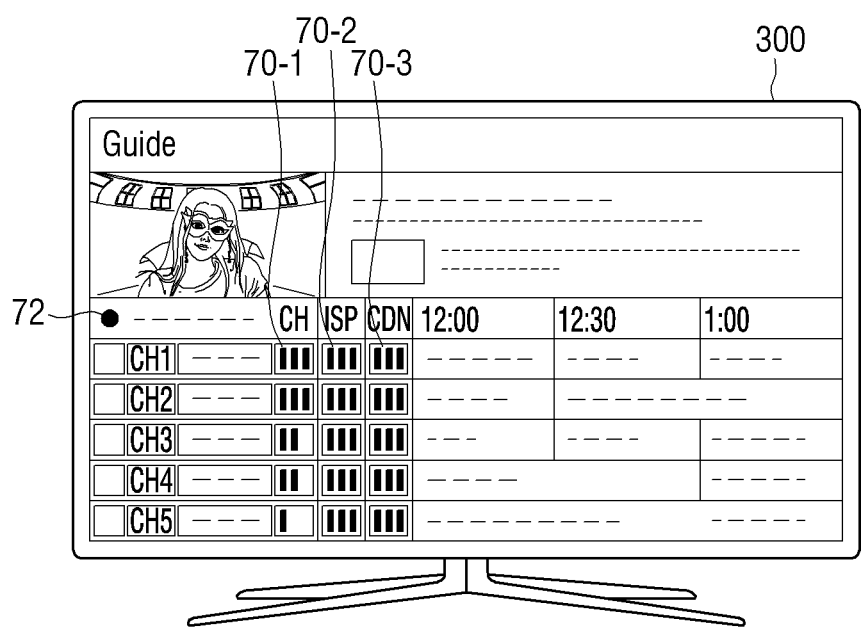
FIG. 7 is a view illustrating information on qualities of channels, a quality of a network of an ISP, a quality of a network of an external server, and information on a home network environment of an electronic apparatus according to an embodiment.

For example, referring to FIG. 7, if the electronic apparatus 300 is an electronic apparatus registered with the first ISP, the quality of channel 1 is the first quality, the network quality of the first ISP is the first quality, and the network quality of the external server 200 is the first quality, the electronic apparatus 300 may provide information that the quality of channel 1 is the first quality (70-1), information that the network quality of the first ISP is the first quality (70-2), and information that the network quality of the external server 200 is the first quality (70-3).

Meanwhile, referring to FIG. 7, the electronic apparatus 300 may provide a channel list including information on a home network environment of the electronic apparatus 300. For example, the electronic apparatus 300 may provide a UI in a green color if the home network speed of the electronic apparatus 300 is the first speed, and provide a UI in a red color if the network speed of the electronic apparatus 300 is the second speed that is slower than the first speed. Alternatively, the electronic apparatus 300 may display information on a home network environment of the electronic apparatus 300 using a vertical bar along with information on a quality of the above-described channel.

Accordingly, a user may receive a feedback regarding reason why a quality of a channel is high or low. For example, if the UI (72) corresponding to the home network environment of a user in FIG. 7 is red, in the case of channel 5, the user may recognize that the quality of channel 5 is identified to be low since the home network environment is low although the network quality of the ISP and the network quality of the external server 200 are high.

FIG. 8 is a view provided to explain an example for identifying a quality of a channel based on a home network environment of an electronic apparatus according to an embodiment.

FIG. 8 is a view illustrating a case in which the first to the third electronic apparatuses registered with the first ISP reproduce content of channel A. As described above, a plurality of electronic apparatuses reproducing the content may transmit information regarding reproduction of the content to the server 100.

For example, the first electronic apparatus reproducing the content of channel A may transmit the first information regarding reproduction of the content of channel A to the server 100, the second electronic apparatus reproducing the content of channel A may transmit the second information regarding reproduction of the content of channel A to the server 100. The processor 120 of the server 100 may identify the quality of channel A in the first electronic apparatus based on the first information, and identify the quality of channel A in the second electronic apparatus based on the second information. As illustrated in FIG. 8, if the first electronic apparatus reproduces the content of channel A normally and the second electronic apparatus does not reproduce the content of channel A normally, the processor 120 may identify that the quality of channel A in the first electronic apparatus is the first quality and the quality of channel A in the second electronic apparatus is the second quality that is lower than the first quality.

Meanwhile, as described above, a plurality of electronic apparatuses may transmit information on a network environment of the electronic apparatuses to the server 100. Here, the information on a network environment may be information on a network speed, but is not limited thereto. The information on a network environment may be information on a network bandwidth, etc.

For example, the first electronic apparatus may transmit information on a network environment of the first electronic apparatus to the server 100, and the second electronic apparatus may transmit information on a network environment of the second electronic apparatus to the server 100.

In addition, the server 100 may transmit information on a quality of channel A in the first electronic apparatus, information on a network environment of the first electronic apparatus, information on a quality of channel A in the second electronic apparatus, and information on a network environment of the second electronic apparatus to the external server 200.

The electronic apparatus 300 may transmit information on a network environment of the electronic apparatus 300 and a signal for requesting a channel list to the external server 200 based on a user command to request a channel list.

Here, the information on a network environment of the electronic apparatus 300 may be information on a network speed of the electronic apparatus 300, but is not limited thereto. The information on a network environment of the electronic apparatus 300 may be information on a network bandwidth of the electronic apparatus 300, etc.

If a signal for requesting a channel list is received from the electronic apparatus 300, the external server 200 may obtain information on a quality of channel A in the electronic apparatus 300 based on information on a quality of channel A received from the server 100, information on a network environment of a plurality of electronic apparatuses and information on a network environment of the electronic apparatus 300.

Specifically, the external server 200 may identify the quality of channel A in an electronic apparatus having a network speed with a difference that is equal to or less than a predetermined value with respect to the network speed of the electronic apparatus 300 as the quality of channel A in the electronic apparatus 300. In other words, the external server 200 may identify the quality of channel A in an electronic apparatus having a network speed that is the same as or similar to the network speed of the electronic apparatus 300 as the quality of channel A in the electronic apparatus 300.

For example, if the quality of channel A in the first electronic apparatus is the first quality, the quality of channel A in the second electronic apparatus is the second quality, the network speed of the first electronic apparatus is 1 Gbps, and the network speed of the second electronic apparatus is 100 Mbps, the external server 200 may identify that the quality of channel A in the electronic apparatus 300 is the first quality when the network speed of the electronic apparatus 300 is 1 Gbps, and identify that the quality of channel A in the electronic apparatus 300 is the second quality when the network speed of the electronic apparatus 300 is 100 Mbps.

The external server 200 may provide a channel list including information on the quality of channel A.

Accordingly, the electronic apparatus 300 may provide information on a quality of a plurality of channels that is customized for the electronic apparatus 300.

Meanwhile, according to an embodiment, the electronic apparatus 300 may identify the quality of channel A.

Specifically, if a signal for requesting a channel list is received from the electronic apparatus 300, the external server 200 may transmit information on a quality of a channel and information on a network environment of a plurality of electronic apparatuses that reproduce the content of the corresponding channel to the electronic apparatus 300.

The electronic apparatus 300 may identify the quality of the corresponding channel in the electronic apparatus 300 based on the information on a quality of a channel and the information on a network environment of a plurality of electronic apparatuses that reproduce the content of the corresponding channel received from the external server 200.

Specifically, the electronic apparatus 300 may identify the quality of a channel in an electronic apparatus having a network speed with a difference that is equal to or less than a predetermined value with respect to the network speed of the electronic apparatus 300 from among a plurality of electronic apparatuses as the quality of a channel in the electronic apparatus 300. In other words, the electronic apparatus 300 may identify the quality of a channel in an external electronic apparatus having a network speed that is the same as or similar to the network speed of the electronic apparatus 300 as the quality of a channel in the electronic apparatus 300.

For example, if the quality of channel A in the first electronic apparatus is the first quality, the quality of channel A in the second electronic apparatus is the second quality, the network speed of the first electronic apparatus is 1 Gbps, and the network speed of the second electronic apparatus is 100 Mbps, the electronic apparatus 300 may identify that the quality of channel A is the first quality when the network speed of the electronic apparatus 300 is 1 Gbps, and identify that the quality of channel A is the second quality when the network speed of the electronic apparatus 300 is 100 Mbps.

The electronic apparatus 300 may provide a channel list including the identified quality of a channel.

Figure 9:
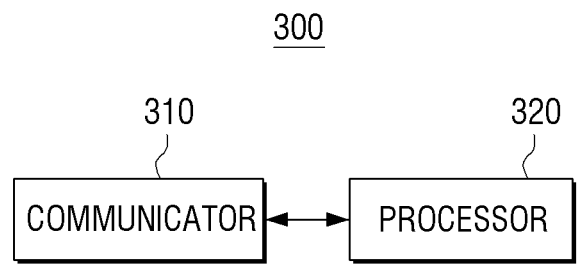
FIG. 9 is a block diagram provided to explain an electronic apparatus according to an embodiment.

FIG. 9 is a block diagram provided to explain an electronic apparatus according to an embodiment.

Referring to FIG. 9, an electronic apparatus 300 according to an embodiment includes a communicator 310 and a processor 320.

The communicator 310 may transmit/receive various data by performing communication with the external server 200 or the server 100.

For example, the communicator 310 may perform communication with the external server 200 or the server 100 through a wireless communication method. To this end, the communicator 310 may include various communication modules to perform network communication. For example, the communicator 310 may include a WiFi chip, a wireless communication chip, etc.

In addition, the communicator 310 may perform communication with the external server 200 or the server 100 through a Local Area Network (LAN), an Internet network, or a mobile communication network.

In particular, the communicator 310 may transmit a signal for requesting a channel list to the external server 200, and receive a channel list including information on a quality of a plurality of channels from the external server 200.

In addition, the communicator 310 may receive content of a selected channel from the external server 200, transmit information regarding reproduction of content of the selected channel to the server 100, and transmit information on a network environment of the electronic apparatus 100 to the external server 200.

Further, the communicator 310 may receive information on a network environment of an external electronic apparatus from the external server 200.

The processor 320 controls the overall operations of the electronic apparatus 300. To this end, the processor 320 may include one or more of a central processing unit (CPU), an application processor (AP) or a communication processor (CP).

The processor 320 may control hardware or software components connected to the processor 320 by driving an operating system or an application system, and perform various data processing and operations. In addition, the processor 320 may load a command or data received from at least one of other components onto a volatile memory and process the same, and store various data in a non-volatile memory.

The processor 320 may request a channel list from the external server 200 based on a user command to request a channel list. Here, the user command to request a channel list may be a user command to push a button for displaying a channel list of a remote control device communicating with the electronic apparatus 300, but is not limited thereto.

The processor 320 may receive a channel list including information on a quality of a plurality of channels from the external server 200 through the communicator 310 based on a user command to request a channel list.

In addition, the processor 320 may receive information on a home network environment of a plurality of external electronic apparatuses reproducing content and information on a quality of a plurality of channels providing the content from the external server 200 based on a user command to request a channel list.

For example, the processor 320 may receive, from the external server 200, information regarding channel 1 where the first quality is matched to the first home network environment and the second quality is matched to the second home network environment.

In this case, the processor 320 may identify that the quality corresponding to the home network environment of the electronic apparatus 300 from among a plurality of qualities of channel 1 as the quality of channel 1 in the electronic apparatus 300. In other words, in the above-described embodiment, if the home network environment of the electronic apparatus 300 is the first home network environment, the processor 320 may identify the quality of channel 1 as the first quality.

The processor 320 may provide a channel list including information that channel is the first quality. Similarly, with respect to other channels, the processor 320 may provide information on a quality of each channel.

Figure 10:
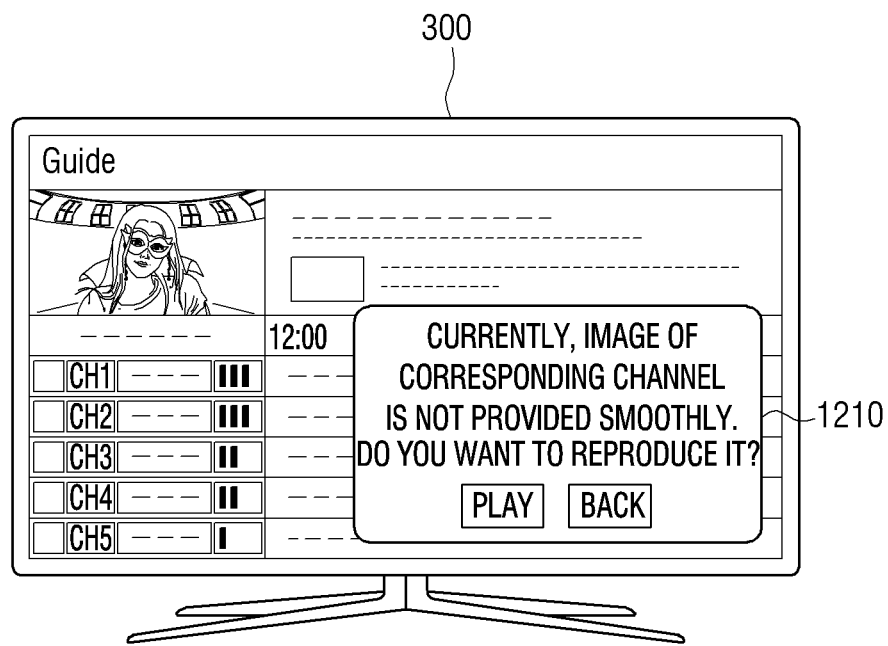
FIG. 10 is a view provided to explain a screen displayed on an electronic apparatus when a channel providing a content of which reproduction is not smooth is selected according to an embodiment.

In addition, if a channel of a low quality is selected, the processor 320 may provide a screen as shown in FIG. 10. For example, if a channel where an initial buffering time exceeds a predetermined time or a channel where buffering occurs more than the predetermined number of times while content is reproduced is selected, the processor 320 may provide a message 1210 that the content may not be reproduced smoothly as shown in FIG. 10.

Accordingly, a user may avoid selecting a channel of a low quality and select a channel capable of reproducing content normally through a channel list.

Figure 11:
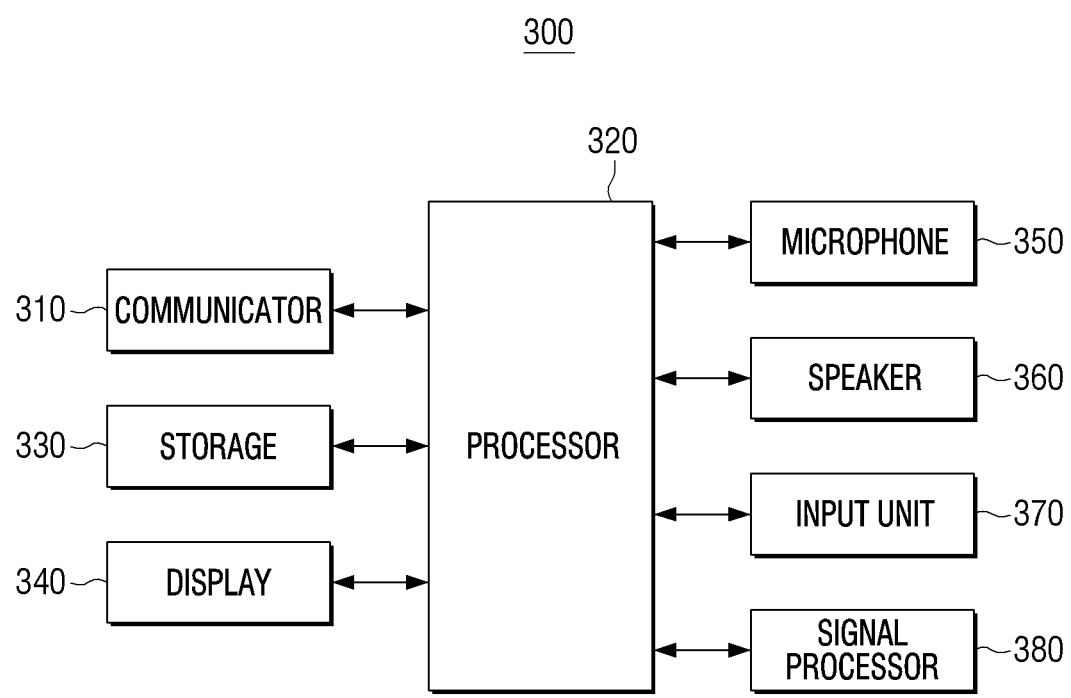
FIG. 11 is a detailed block diagram provided to explain an electronic apparatus according to an embodiment.

FIG. 11 is a detailed block diagram provided to explain an electronic apparatus according to an embodiment.

Referring to FIG. 11, the electronic apparatus 300 according to an embodiment may include the communicator 310, a storage 330, a display 340, a microphone 350, a speaker 360, an input unit 370, a signal processor 380, and the processor 320. Hereinafter, the parts overlapping with the above descriptions will be omitted or abbreviated.

The communicator 310 may communicate with an external device to transmit/receive various data. For example, the communicator 310 may perform communication with an electronic apparatus not only through a Local Area Network (LAN), an Internet network, or a mobile communication network but also through various communication methods such as Bluetooth (BT), Bluetooth Low Energy (BLE), Wireless Fidelity (WI-FI), Zigbee, NFC, etc.

To this end, the communicator 310 may include various communication modules to perform network communication. For example, the communicator 310 may include a Bluetooth chip, a WiFi chip, a wireless communication chip, etc.

In particular, the communicator 310 may perform communication with the external server 200, and receive a channel list from the external server 200. In addition, the communicator 310 may transmit information regarding reproduction of content and information on a home network environment of the electronic apparatus 300 to the server 100.

The storage 330 may store an operating system (OS) for controlling the overall operations of the components of the electronic apparatus 300 and commands or data related to the components of the electronic apparatus 300.

Accordingly, the processor 320 may control a plurality of hardware or software components of the electronic apparatus 300 using various commands or data stored in the storage 330, load commands or data received from at least one of the other components onto a volatile memory and process the same, and store various data in a non-volatile memory.

The display 340 may display various screens. For example, the display 340 may display not only a pre-stored image but also an image received from an external device. Here, the external device may be various electronic apparatuses capable of transmitting an image to the electronic apparatus 300, such as a server, a computer, a notebook computer, a smartphone, etc.

Meanwhile, the image may include at least one of a still image or a moving image, and the display 340 may display various images such as broadcast content, multi-media content, etc. In addition, the display 340 may display various user interfaces (UIs) and icons. Further, the display 340 may display a channel list including information on a quality of a channel.

As such, the display 340 may be implemented as various types of displays such as Liquid Crystal Display Panel (LCD), light emitting diode (LED), Organic Light Emitting Diodes (OLED), Liquid Crystal on Silicon (LCoS), Digital Light Processing (DLP), etc. In addition, the display 340 may also include a driving circuit, a backlight unit, etc. that can be implemented in the form of a-si TFT, low temperature poly silicon (LTPS) TFT, organic TFT (OTFT), etc.

Further, the display 340 may be implemented as a touch screen in combination with a touch sensor.

The microphone 350 may receive a user voice. Here, the user voice may be a voice for executing a specific function of the electronic apparatus 300. When a user voice is received through the microphone 350, the processor 320 may analyze the user voice through a speech to text (STT) algorithm, and perform a function corresponding to the user voice.

For example, when a user voice for displaying a channel list is received through the microphone 350, the processor 320 may control the display 340 to display a channel list.

The speaker 360 may output various audios. For example, the speaker 360 may output an audio when displaying a channel list.

The input unit 370 may receive various user commands. The processor 320 may execute a function corresponding to a user command input through the input unit 370.

For example, the input unit 370 may receive a user command for displaying a channel list. In addition, the input unit 370 may receive a user command for performing turn-on of power, channel change, volume control, etc., and the processor 320 may perform turn-on of power, channel change, volume control, etc. of the electronic apparatus 300.

To this end, the input unit 370 may be implemented as an input panel. The input panel may be implemented as a touch pad or a key pad or a touch screen including various function keys, number keys, special keys, character keys, etc.

The signal processor 380 may perform signal-processing with respect to content received through the communicator 310. Specifically, the signal processor 380 may perform operations such as decoding, scaling, frame rate conversion, etc. of an image constituting content to signal-process the image to be in a form that can be output in the electronic apparatus 100. In addition, the signal processor 380 may perform signal-processing such as decoding, etc. of an audio constituting content to signal-process the audio to be in a form that can be output in the speaker 360.

Accordingly, the display 340 may display the image, etc. output from the signal processor 380, and the speaker 360 may output the audio output from the signal processor 380.

Figure 12:
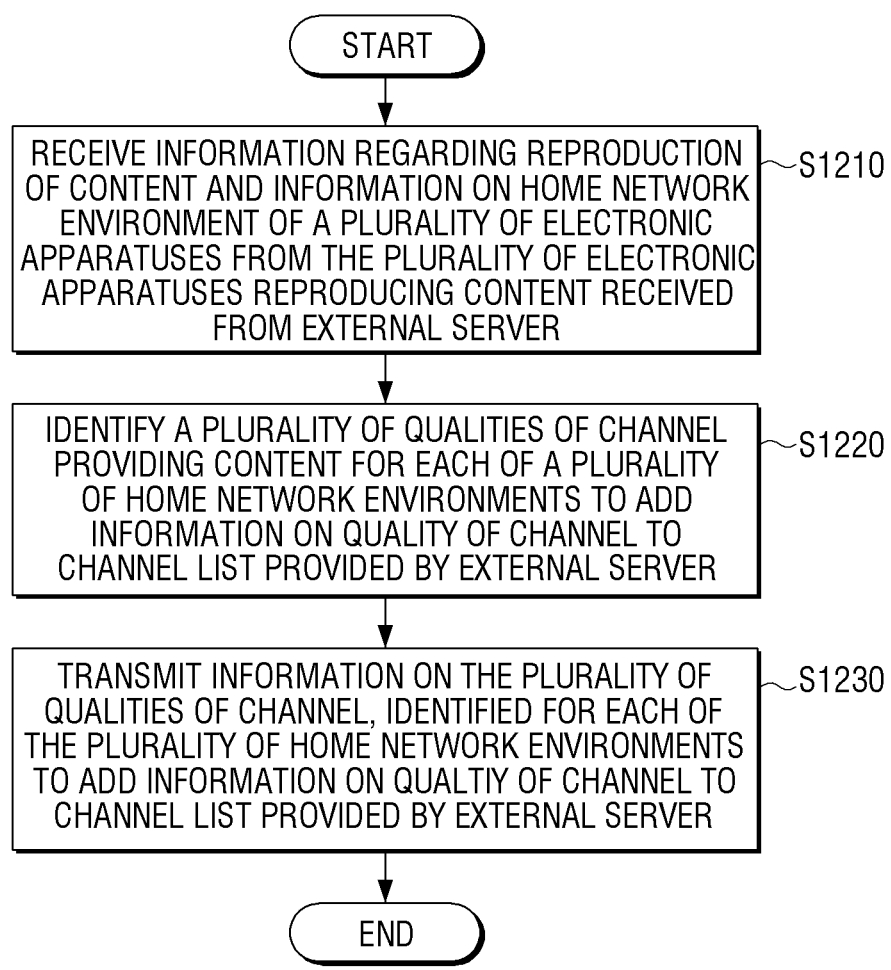
FIG. 12 is a flowchart provided to explain a controlling method of an electronic apparatus according to an embodiment.

FIG. 12 is a flowchart provided to explain a controlling method of an electronic apparatus according to an embodiment.

The server 100 may receive information regarding reproduction of content and information on a home network environment of a plurality of electronic apparatuses from the plurality of electronic apparatuses that reproduce content received from an external server (S1210).

Here, the information regarding reproduction of content may include at least one of an initial buffering time required for an electronic apparatus to reproduce content or the number of buffering occurred in the electronic apparatus while the content is reproduced.

The home network of the electronic apparatus is a network that is formed between electronic apparatuses in a home. As an example, the home network may be a network formed between an electronic apparatus and an AP or a network formed between an electronic apparatus and a router, and the information on a home network environment of an electronic apparatus may include information on a network speed of an electronic apparatus or information on a network bandwidth.

The server 100 may identify a plurality of qualities of a channel that provides content for each of a plurality of home network environments based on information regarding reproduction of content (S1220).

Specifically, if the quality of channel 1 selected in the first electronic apparatus is the first quality and the home network environment of the first electronic apparatus is the first home network environment, the server 100 may identify that the quality of channel 1 in the first home network environment is the first quality. In addition, if the quality of channel 1 selected in the second electronic apparatus is the second quality and the home network environment of the second electronic apparatus is the second home network environment, the server 100 may identify that the quality of channel 1 in the second home network environment is the second quality.

The server 100 may transmit information on a plurality of qualities of a channel, identified for each of a plurality of home network environments to the external server to add information on a quality of a channel to a channel list provided by the external server (S1230).

Specifically, the server 100 may transmit information on a quality of a channel where a quality of a channel is matched to each home network environment to the external server. In the above embodiment, the server 100 may transmit information regarding channel 1 where the first home network environment is matched to the first quality and information regarding channel 1 where the second home network environment is matched to the second quality to the external server.

Subsequently, when receiving a signal for requesting a channel list is received from an electronic apparatus, the external server may transmit a channel list including information on a quality of a plurality of channels to the electronic apparatus.

The electronic apparatus may provide the channel list including information on a quality of a plurality of channels.

Accordingly, a user may check a quality of each channel and select a channel providing content that can be reproduced normally.

According to the above-described various embodiments, a channel list including information on a quality of a channel may be provided. Accordingly, a user may avoid selecting a channel of a low quality through the channel list and select a channel capable of reproducing content normally.

Meanwhile, the methods according to the above-described various embodiments of the present disclosure may be implemented in the form of software or an application that is installable in the existing electronic apparatus.

In addition, the methods according to the above-described various embodiments of the present disclosure may be implemented only through software upgrade or hardware upgrade with respect to the existing electronic apparatus.

Further, the above-described various embodiments may be performed through an embedded server provided in an electronic apparatus or an external server of the electronic apparatus.

Meanwhile, a non-transitory computer readable medium where a program for sequentially performing a controlling method of an electronic apparatus according to an embodiment is stored may be provided.

The non-transitory computer-readable medium is not a medium that stores data for a while, such as a register, a cache, a memory, or the like, but means a medium that semi-permanently stores data and is readable by the device. Specifically, the above-described various applications or programs may be stored and provided in a non-transitory computer-readable medium such as a compact disk (CD), a digital versatile disk (DVD), a hard disk, a Blu-ray disk, a USB, a memory card, a ROM, and the like.

While preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and such modifications are not to be interpreted independently from the technical idea or prospect of the disclosure.

What is claimed is:

1. A server comprising:
a communicator; and
a processor configured to:
from a plurality of electronic apparatuses that reproduce content received from an external server, receive information regarding reproduction of the content and information on home network environments of the plurality of electronic apparatuses through the communicator;
based on the information regarding reproduction of the content, identify qualities of a channel providing the content for a plurality of internet service providers (ISPs);
based on the information on the home network environments of the plurality of electronic apparatuses and information on the qualities of the channel, identify network qualities of the plurality of ISPs; and
transmit information on the network qualities of the plurality of ISPs to the external server to add the information on the network qualities of the plurality of ISPs to a channel list provided by the external server.

2. The server as claimed in claim 1, wherein the channel list is transmitted from the external server to an external electronic apparatus based on a user command to request a channel list, which is input to the external electronic apparatus, and
wherein the information on the qualities of the channel included in the channel list includes information on a quality of a channel that is identified based on a home network environment corresponding to a home network environment of the external electronic apparatus from among the home network environments.

3. The server as claimed in claim 1, wherein the information on the home network environments includes at least one of information on a home network speed of the plurality of electronic apparatuses or information on a home network bandwidth of the plurality of electronic apparatuses.

4. The server as claimed in claim 2, wherein the channel list includes information on the home network environment of the external electronic apparatus.

5. The server as claimed in claim 1, wherein the processor is configured to identify a quality of a channel that provides the content based on at least one of an initial buffering time required for an electronic apparatus to reproduce the content or a number of buffering occurred in the electronic apparatus during reproduction of the content, included in the information regarding reproduction of the content.

6. The server as claimed in claim 1, wherein the processor is configured to identify a quality of the channel in a first electronic apparatus connected to a network of a first ISP of the plurality of ISPs as a first quality and identify a quality of the channel in a second electronic apparatus connected to a network of a second ISP of the plurality of ISPs as a second quality, and based on a difference between home network environments of the first and second electronic apparatuses being equal to or less than a predetermined range, identify a network quality of the first ISP as a first network quality and identify a network quality of the second ISP as a second network quality that is lower than the first network quality.

7. The server as claimed in claim 1, wherein the processor is configured to identify a quality of a network of the external server based on a network quality of the plurality of ISPs.

8. The server as claimed in claim 7, wherein the processor is configured to:
based on a network quality of a first ISP of the plurality of ISPs being identified as a first network quality and a network quality of a second ISP of the plurality of ISPs being identified as a second network quality that is lower than the first network quality, identify a quality of a network of the external server as a first quality;
based on a network quality of the plurality of ISPs being identified as the second network quality, identify the quality of the network of the external server as a second quality; and
transmit information on the quality of the network of the external server to the external server to add a quality of the content to the channel list.

9. The server as claimed in claim 7, wherein the channel list includes information on a quality of the channel, information on a network quality of an ISP and information on a quality of a network of the external server.

10. A controlling method of a server, comprising:
from a plurality of electronic apparatuses that reproduce content received from an external server, receiving information regarding reproduction of the content and information on home network environments of the plurality of electronic apparatuses through a communicator;
based on the information regarding reproduction of the content, identifying qualities of a channel providing the content for a plurality of internet service providers (ISPs);
based on the information on the home network environments of the plurality of electronic apparatuses and information on the qualities of the channel, identifying network qualities of the plurality of ISPs; and
transmitting information on the network qualities of the plurality of ISPs to the external server to add information on a network quality of an ISP to a channel list.

11. The method as claimed in claim 10, wherein the channel list is transmitted from the external server to an external electronic apparatus based on a user command to request a channel list, which is input to the external electronic apparatus, and
wherein the information on the qualities of the channel included in the channel list includes information on a quality of a channel that is identified based on a home network environment corresponding to a home network environment of the external electronic apparatus from among the home network environments.

12. The method as claimed in claim 10, wherein the information on the home network environments includes at least one of information on a home network speed of the plurality of electronic apparatuses or information on a home network bandwidth of the plurality of electronic apparatuses.

13. The method as claimed in claim 11, wherein the channel list includes information on the home network environment of the external electronic apparatus.

14. The method as claimed in claim 10, wherein the identifying of the qualities comprise identifying a quality of a channel that provides the content based on at least one of an initial buffering time required for an electronic apparatus to reproduce the content or a number of buffering occurred in the electronic apparatus during reproduction of the content, included in the information regarding reproduction of the content.

15. The method as claimed in claim 10, wherein the identifying of the network qualities of the plurality of ISPs comprises identifying a quality of the channel in a first electronic apparatus connected to a network of a first ISP of the plurality of ISPs as a first quality and identifying a quality of the channel in a second electronic apparatus connected to a network of a second ISP of the plurality of ISPs as a second quality, and based on a difference between home network environments of the first and second electronic apparatuses being equal to or less than a predetermined range, identifying a network quality of the first ISP as a first network quality and identify a network quality of the second ISP as a second network quality that is lower than the first network quality.

16. The method as claimed in claim 10, further comprising:
identifying a quality of a network of the external server based on the network qualities of the plurality of ISPs.

17. The method as claimed in claim 16, further comprising:
based on a network quality of a first ISP of the plurality of ISPs being identified as a first network quality and a network quality of a second ISP of the plurality of ISPs being identified as a second network quality that is lower than the first network quality, identifying a quality of a network of the external server as a first quality;
based on a network quality of the plurality of ISPs being identified as the second network quality, identifying the quality of the network of the external server as a second quality; and
transmitting information on the quality of the network of the external server to the external server to add a quality of the content to the channel list.

18. The method as claimed in claim 16, wherein the channel list includes information on a quality of the channel, information on a network quality of an ISP and information on a quality of a network of the external server.

* * * * *